US009249902B2

(12) United States Patent
Munroe et al.

(10) Patent No.: US 9,249,902 B2
(45) Date of Patent: Feb. 2, 2016

(54) SEALING SYSTEM

(71) Applicant: National Oilwell Varco, L. P., Houston, TX (US)

(72) Inventors: Richard Poundstone Munroe, Santa Ana, CA (US); Lawrence E. Wells, Yorba Linda, CA (US); Arthur William Braman, Cypress, CA (US)

(73) Assignee: National Oilwell Varco, L.P., Houston, TX (US)

( * ) Notice: Subject to any disclaimer, the term of this patent is extended or adjusted under 35 U.S.C. 154(b) by 249 days.

(21) Appl. No.: 14/084,517

(22) Filed: Nov. 19, 2013

(65) Prior Publication Data

US 2014/0138920 A1    May 22, 2014

Related U.S. Application Data

(60) Provisional application No. 61/729,326, filed on Nov. 21, 2012, provisional application No. 61/800,894, filed on Mar. 15, 2013.

(51) Int. Cl.
*F16L 5/08* (2006.01)
*F16L 5/02* (2006.01)
(Continued)

(52) U.S. Cl.
CPC . *F16L 5/02* (2013.01); *F16L 39/02* (2013.01); *H01R 13/5205* (2013.01);
(Continued)

(58) Field of Classification Search
CPC ....... H02G 3/088; H02G 3/22; H02G 15/013; F16L 5/08; H01R 13/5208
See application file for complete search history.

(56) References Cited

U.S. PATENT DOCUMENTS 2,791,277 A * 5/1957 Ilfrey .................... E21B 33/122
166/118
2,813,692 A * 11/1957 Peterson .............. H01B 17/306
174/152 R (Continued)

FOREIGN PATENT DOCUMENTS

DE          43 11 190 A1    10/1994
FR          2 305 674 A1    10/1976
WO      WO 02/070942 A1     9/2002

OTHER PUBLICATIONS

International Search Report dated Jan. 21, 2014 for International Application PCT/US2013/070830, 5 sheets.

(Continued)

*Primary Examiner* — Kristina Fulton
*Assistant Examiner* — Nicholas L Foster
(74) *Attorney, Agent, or Firm* — Derek V. Forinash; Porter Hedges LLP

(57) ABSTRACT

A system configured to seal at least one flexible longitudinal member is provided. In one embodiment, the system includes a sealing member having at first set of apertures, a second set of apertures, and inner and outer interface surfaces. The system also includes a clamping member having a first set of apertures and an interface surface. The first set of apertures in the clamping member is configured to align with the first set of apertures in the sealing member. The first sets of apertures are configured to receive the at least one flexible longitudinal member. The interface surface of the clamping member is configured to abut the inner interface surface of the sealing member. The system also includes at least one threaded blind bore in the interface surface of the clamping member, and at least one fastener configured to draw the clamping member into engagement with the sealing member.

21 Claims, 7 Drawing Sheets

(51) Int. Cl.
*H02G 3/08* (2006.01)
*H02G 15/013* (2006.01)
*H01R 13/52* (2006.01)
*F16J 15/02* (2006.01)
*H02G 3/22* (2006.01)
*F16L 39/02* (2006.01)

(52) U.S. Cl.
CPC .......... *H01R 13/5208* (2013.01); *H02G 3/088* (2013.01); *H02G 3/22* (2013.01); *H02G 15/013* (2013.01); *F16J 15/022* (2013.01); *F16L 5/08* (2013.01)

(56) References Cited

U.S. PATENT DOCUMENTS

| | | | | |
|---|---|---|---|---|
| 3,655,907 | A * | 4/1972 | Philibert | H02G 15/013 138/89 |
| 3,803,531 | A * | 4/1974 | Sorensen | G21C 17/116 174/151 |
| 3,933,379 | A | 1/1976 | Pontigny | |
| 4,061,344 | A * | 12/1977 | Bradley | E04B 1/947 174/151 |
| 4,267,401 | A * | 5/1981 | Wilkinson | H01B 17/308 174/151 |
| 4,377,291 | A * | 3/1983 | Albertini | G02B 6/4471 277/619 |
| 4,424,412 | A * | 1/1984 | Goetter | H02G 15/013 174/77 R |
| 5,007,701 | A * | 4/1991 | Roberts | G02B 6/3801 174/23 R |
| 5,266,743 | A * | 11/1993 | Helbawi | H02G 15/013 156/49 |
| 5,491,300 | A * | 2/1996 | Huppenthal | H01R 13/5216 174/151 |
| 5,920,035 | A * | 7/1999 | Haney | B01D 61/02 174/152 G |
| 2006/0063418 | A1* | 3/2006 | Motzigkeit | H02G 3/088 439/425 |
| 2008/0265527 | A1* | 10/2008 | Free | F16L 5/06 277/641 |
| 2010/0001476 | A1* | 1/2010 | Broder | F16L 5/08 277/606 |
| 2010/0013213 | A1* | 1/2010 | Katsura | F16L 39/005 285/29 |
| 2010/0320694 | A1* | 12/2010 | Gromotka | B29C 45/14385 277/316 |

OTHER PUBLICATIONS

Written Opinion for PCT application No. PCT/US2013/070830 mailed by the European Patent Office on Jan. 29, 2014 (8 pages).

* cited by examiner

SEALING SYSTEM

CROSS-REFERENCE TO RELATED APPLICATIONS

This application claims priority to and the benefit of U.S. Provisional Application No. 61/729,326, filed Nov. 21, 2012, and U.S. Provisional Application No. 61/800,894, filed Mar. 15, 2013, the entire contents of both of which are incorporated herein by reference.

FIELD

The present invention relates to sealing systems, and more particularly a system for sealing wires, tubes, and conduits penetrating a wall member.

BACKGROUND

Top drive motors (i.e., drilling motors for driving a drill string and a bit attached thereto to form a borehole) are typically air cooled via a blower. In harsh weather environments, the blower may intake rainwater, which in turn may enter a junction box which houses a variety of electrical components (e.g., buss bars and other electrical disconnects). One potential leak path on top drive motors is along the various wires, cables, conduits, and tubes which extend from the motor to the junction box on the top drive (e.g., water may tend to wick along wires, cables, tubes, and conduits penetrating into the junction box). The presence of water in the junction box may damage the various electrical components housed in the junction box and create an electrical shock hazard for workers. Accordingly, the present invention is directed to a sealing system for creating a water tight seal around wires, cables, tubes, and conduits, passing through an aperture. In one embodiment, the sealing system of the present invention is configured to create a water tight seal around wires passing from a top drive motor and into a junction box, although the present invention is not limited to such applications.

SUMMARY

The present invention relates to sealing systems, and more particularly a system for sealing at least one flexible longitudinal member, such as an insulated wire, a conductor, a conduit, a pipe, or a tube, penetrating a wall member. In one embodiment, the system includes a sealing member having at first set of apertures, a second set of apertures, an inner interface surface, and an outer interface surface. The system also includes a clamping member having a first set of apertures and an interface surface. The first set of apertures in the clamping member is configured to align with the first set of apertures in the sealing member. The first sets of apertures in the clamping member and the sealing member are configured to receive the at least one flexible longitudinal member. The interface surface of the clamping member is configured to abut the inner interface surface of the sealing member. The system also includes at least one threaded blind bore in the interface surface of the clamping member, and at least one fastener configured to extend through the second set of apertures in the sealing member and into the at least one threaded blind bore in the clamping member. The at least one fastener is configured to draw the clamping member into engagement with the sealing member. In one embodiment, both the clamping member and the sealing member are generally rectangular. In one embodiment, the clamping member comprises a non-magnetic metal.

In one embodiment, each aperture of the first set of apertures in the sealing member is configured to circumferentially contract around the at least one flexible longitudinal member when the clamping member is drawn into engagement with the sealing member by the fastener. In one embodiment, each aperture of the first set of apertures in the sealing member is generally circular in transverse cross-section.

In one embodiment, the first set of apertures in the clamping member includes at least one smaller aperture and at least one larger aperture, wherein each of the larger apertures houses a sleeve. In one embodiment, the sleeves include a non-conductive material. In one embodiment, each sleeve includes a cylindrical tube portion, an annular flange portion circumferentially extending around a first end of the cylindrical tube, and an annular lip defined between the cylindrical tube portion and the annular flange portion. In one embodiment, each of the larger apertures in the clamping member includes a recess in the interface surface and the annular flange on the sleeve is configured to be received in the recess in the clamping member to retain the sleeve in the aperture.

In another embodiment, the clamping member further includes at least one pin protruding from the interface surface of the clamping member. In one embodiment, the system includes a junction plate having a first set of apertures and an inner interface surface, the first set of apertures in the junction plate are configured to receive the at least one flexible longitudinal member and are configured to align with the first set of apertures in the sealing member and the first set of apertures in the clamping member, and the inner interface surface of the junction plate is configured to abut the outer interface surface of the sealing member. In one embodiment, the junction plate includes at least one bore in the interface surface, the at least one bore in the junction plate having a depth and a bottom surface, and wherein the at least one bore in the junction plate is configured to slidably receive a portion of the at least one pin protruding from the clamping member.

In one embodiment, the at least one pin is configured to slide between a disengaged position in which the at least one pin is spaced apart from the bottom surface of the bore in the junction plate by a first distance, and an engaged position in which the at least one pin is spaced apart from the bottom surface of bore in the bore in the junction plate by a second distance (e.g., substantially zero). In one embodiment, the at least one pin protrudes from the interface surface of the clamping plate by a distance at least as great as the depth of the at least one bore in the junction plate. In one embodiment, one of the at least one threaded blind bore in the interface surface of the clamping member is adjacent one of the at least one pin protruding from the interface surface of the clamping member. In one embodiment, the first set of apertures in the junction plate includes at least one smaller aperture and at least one larger aperture, and each of the larger apertures house a sleeve.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

Embodiments of a sealing system according to the present invention are described with reference to the following figures. The same reference numerals are used throughout the figures to reference like features and components. The figures are not necessarily drawn to scale.

DETAILED DESCRIPTION

Figure 1:
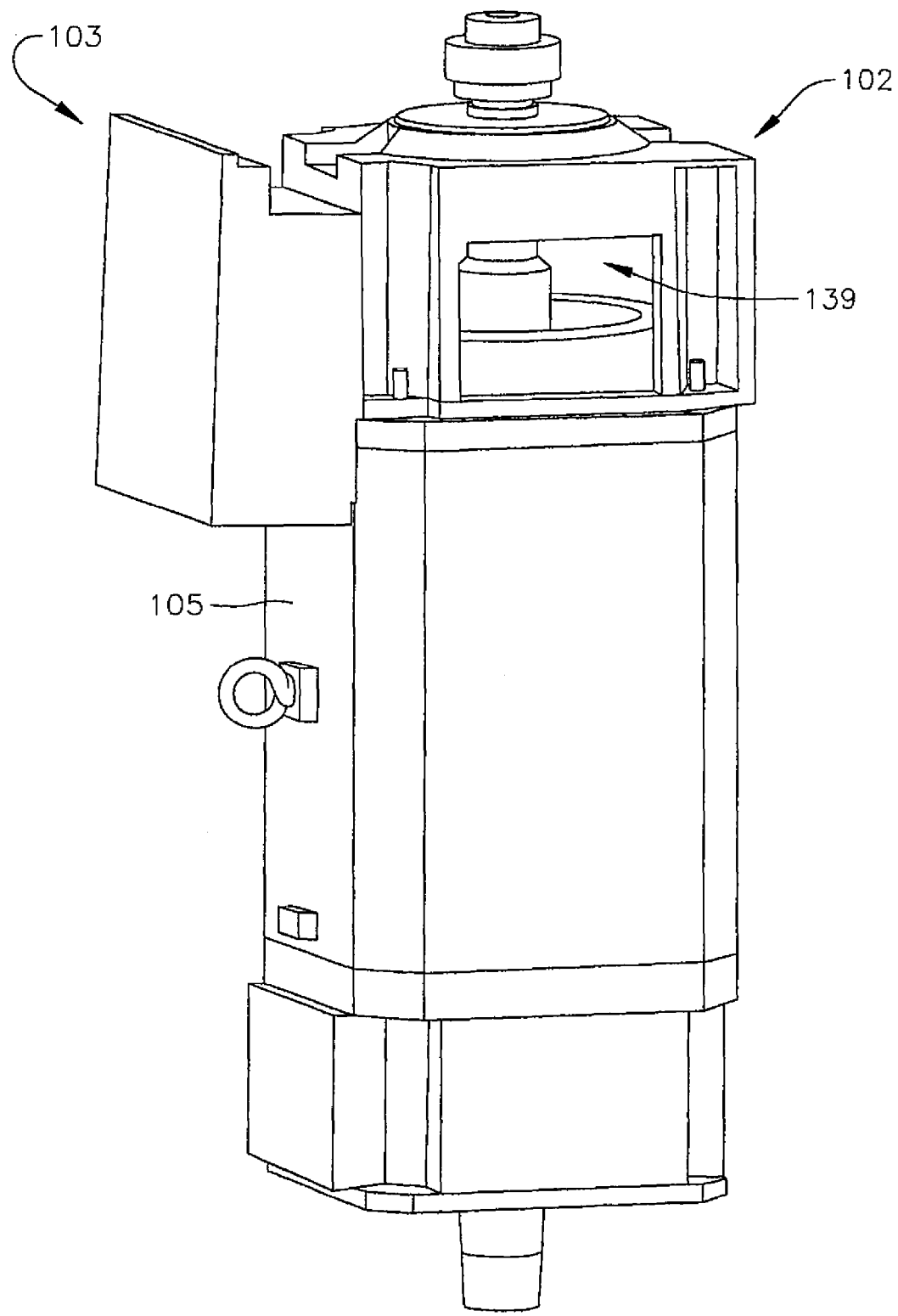
FIG. 1 is a perspective view of a junction box attached to a top drive drilling motor.

The present invention is directed to a system for creating a water-tight seal around one or more flexible longitudinal members penetrating a wall panel segment. With reference to the embodiment illustrated in FIG. 1, the sealing system 100 is configured to create a water-tight seal around a plurality of various wires, cables, conduits, tubes, hoses, and/or pipes 101 (also referred to herein as "flexible longitudinal members") which extend from a top drive motor housing 102 to a junction box 103 attached to the side of the motor housing 102. The junction box 103 houses a variety of electrical components (e.g., buss bars and other electrical disconnects). The wires, cable, conduits, and/or tubes 101 extending from the top drive motor housing 102 terminate at the buss bars or other electrical disconnects housed in the junction box 103.

Figure 2:
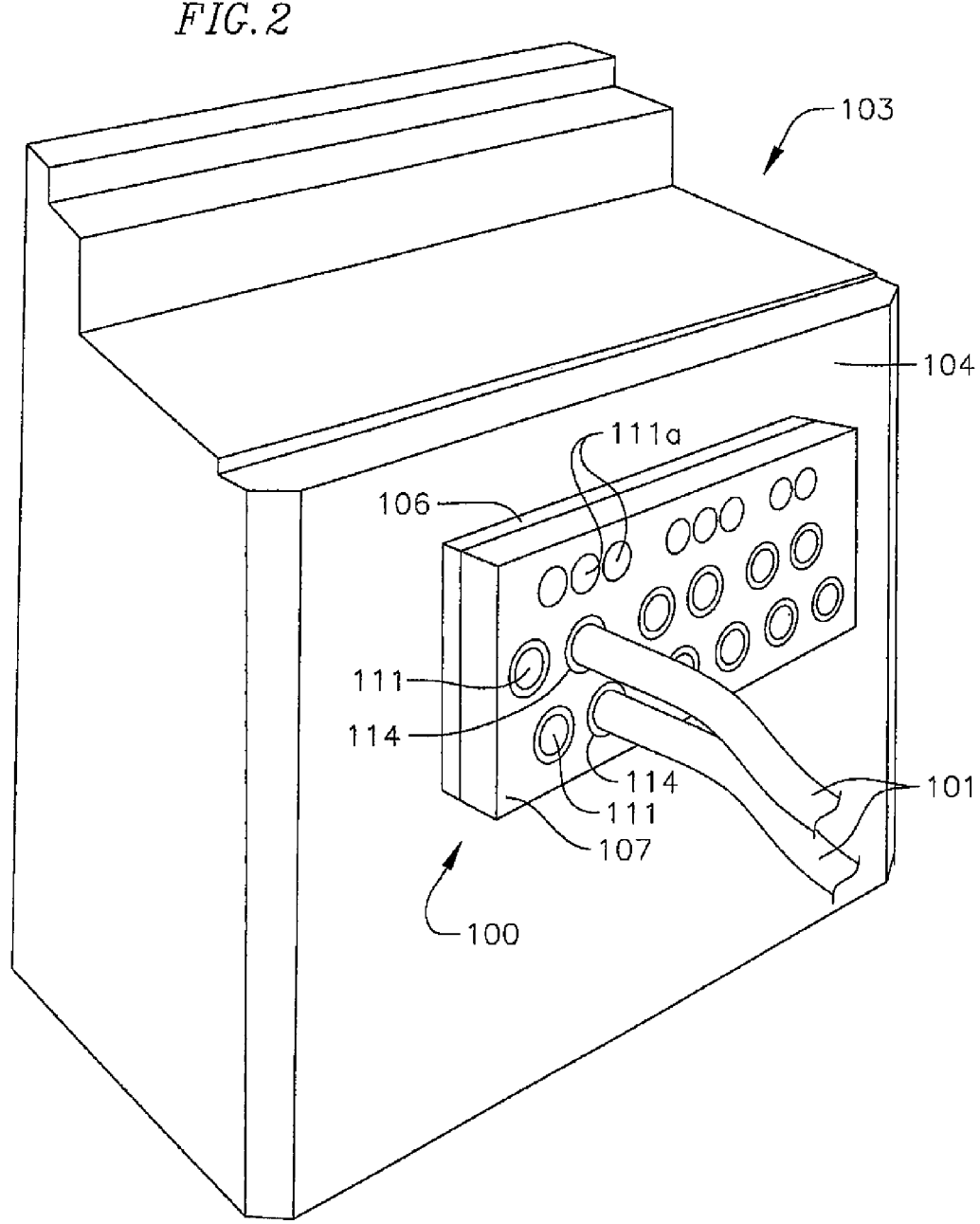
FIG. 2 is a rear perspective view of the junction box of FIG. 1 having a sealing system attached thereto according to one embodiment of the present invention.
Figure 5A:
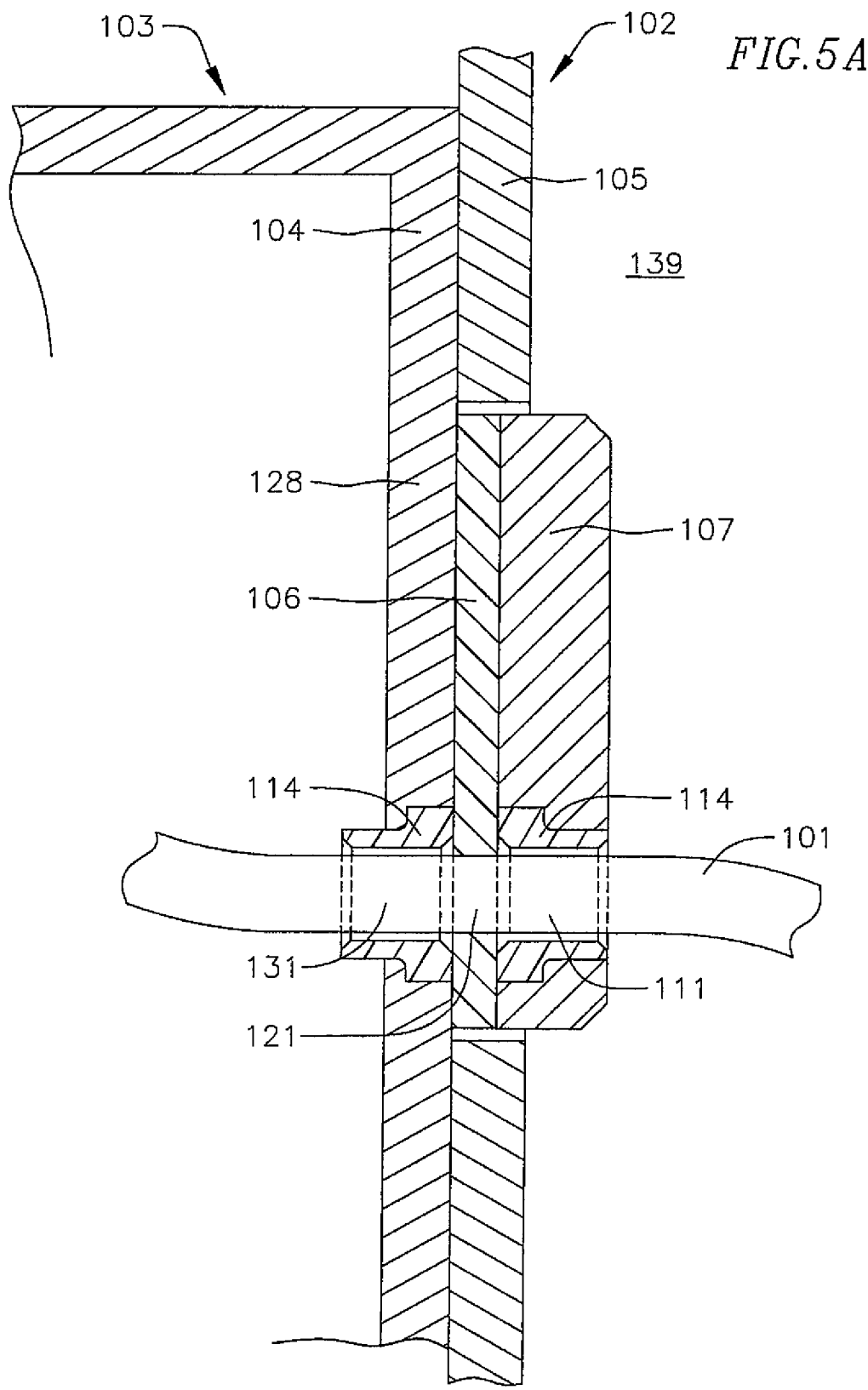
FIGS. 5A and 5B are cross-sectional views of the junction box and the sealing system taken along the lines shown in FIG. 4 according to one embodiment of the present invention.
Figure 5B:
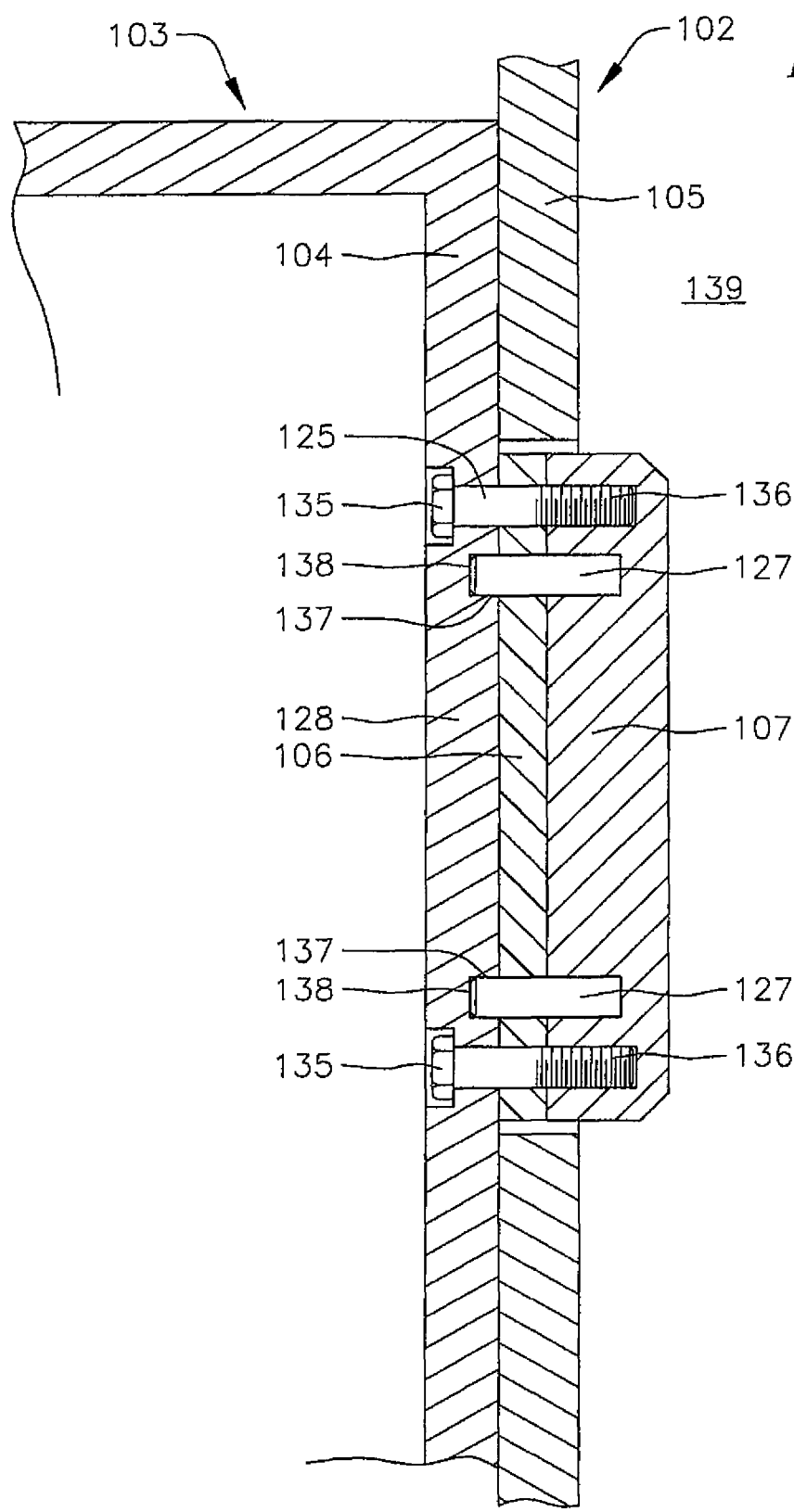

With reference now to the embodiment illustrated in FIG. 2, the sealing system 100 is attached to a wall 104 of the junction box 103. The wall 104 of the junction box 103 is configured to abut an outer panel 105 of the motor housing 102, as illustrated in FIGS. 1, 5A, and 5B. Accordingly, the sealing system 100 is located between the junction box 103 and the motor housing 102. The top drive motor housing 102 is omitted in FIG. 2 for clarity. In the illustrated embodiment, the sealing system 100 includes a sealing member 106 and a clamping member 107, both of which are configured to receive the one or more of the flexible longitudinal members 101 extending between the motor housing 102 and the junction box 103. The clamping member 107 is configured to compress the sealing member 106 to form a water-tight seal around the one or more longitudinal members 101 extending through the sealing member 106 and the clamping member 107. As described in more detail below, when the sealing member 106 is compressed by the clamping member 107, apertures in the sealing member, through which the flexible longitudinal members 101 extend, circumferentially contract around the flexible longitudinal members 101 to create a water-tight seal.

Figure 3A:
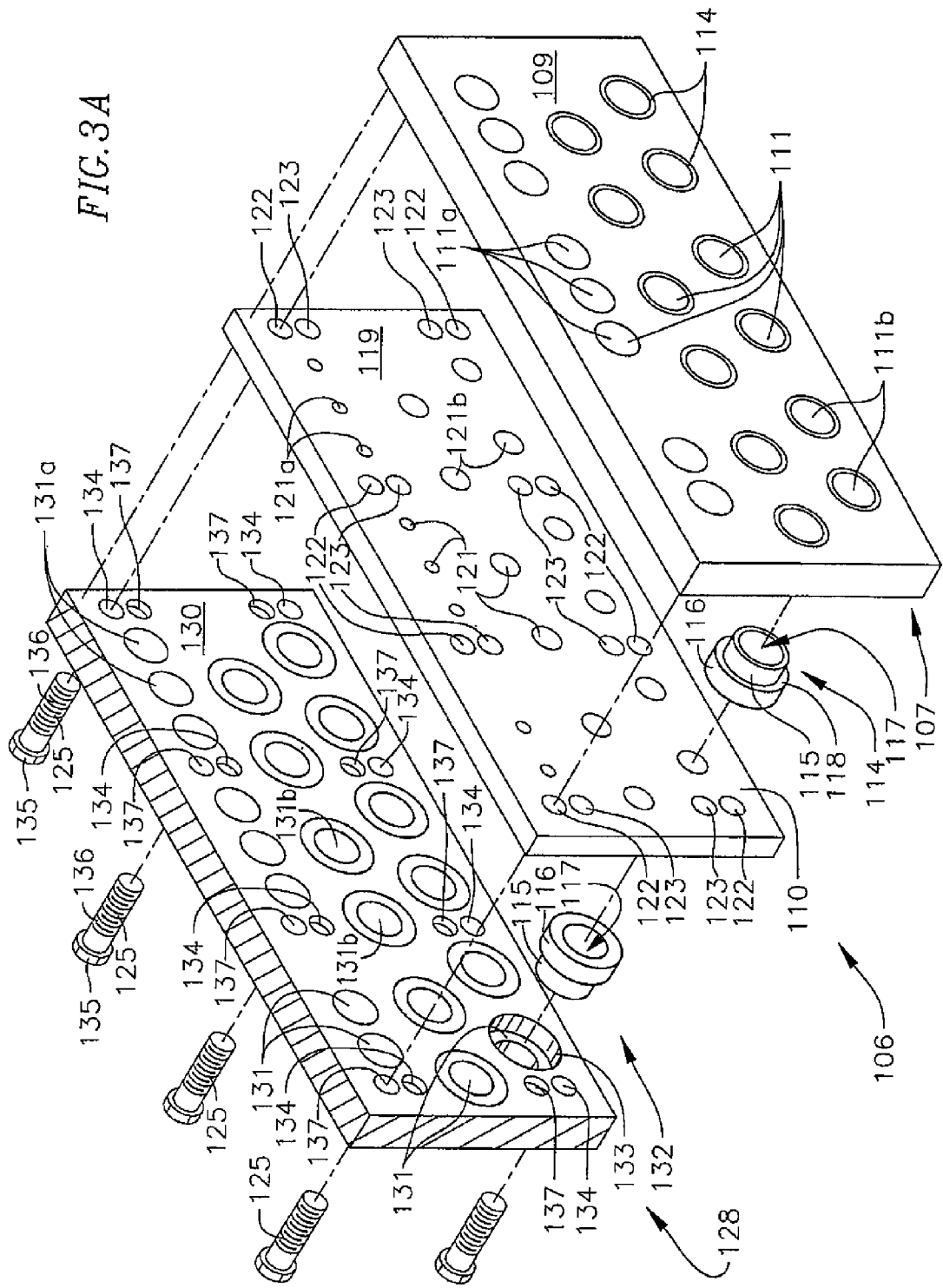
FIGS. 3A and 3B are exploded rear and front perspective views, respectively, of the junction box and the sealing system of FIG. 2 according to one embodiment of the present invention.
Figure 3B:
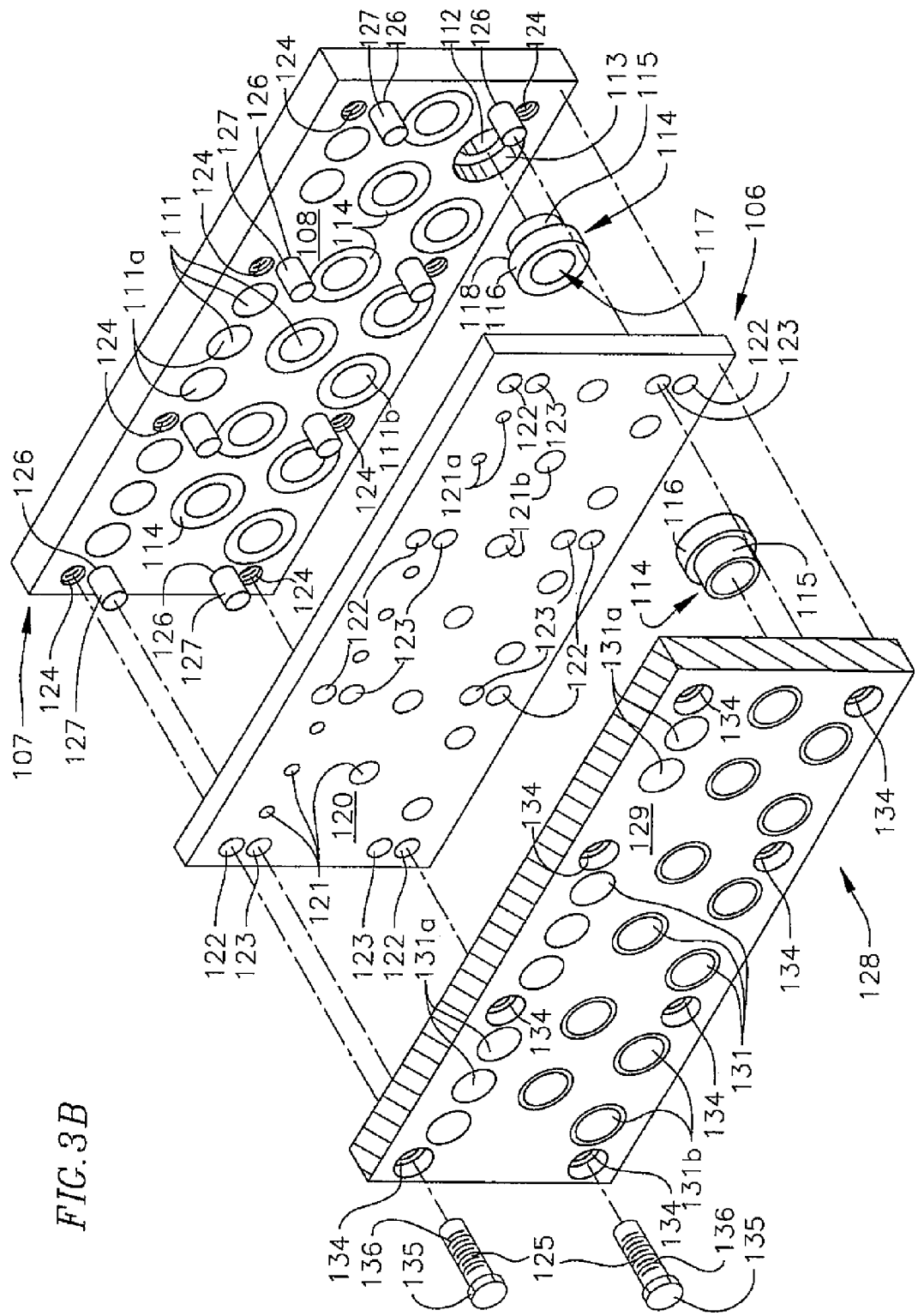
Figure 4:
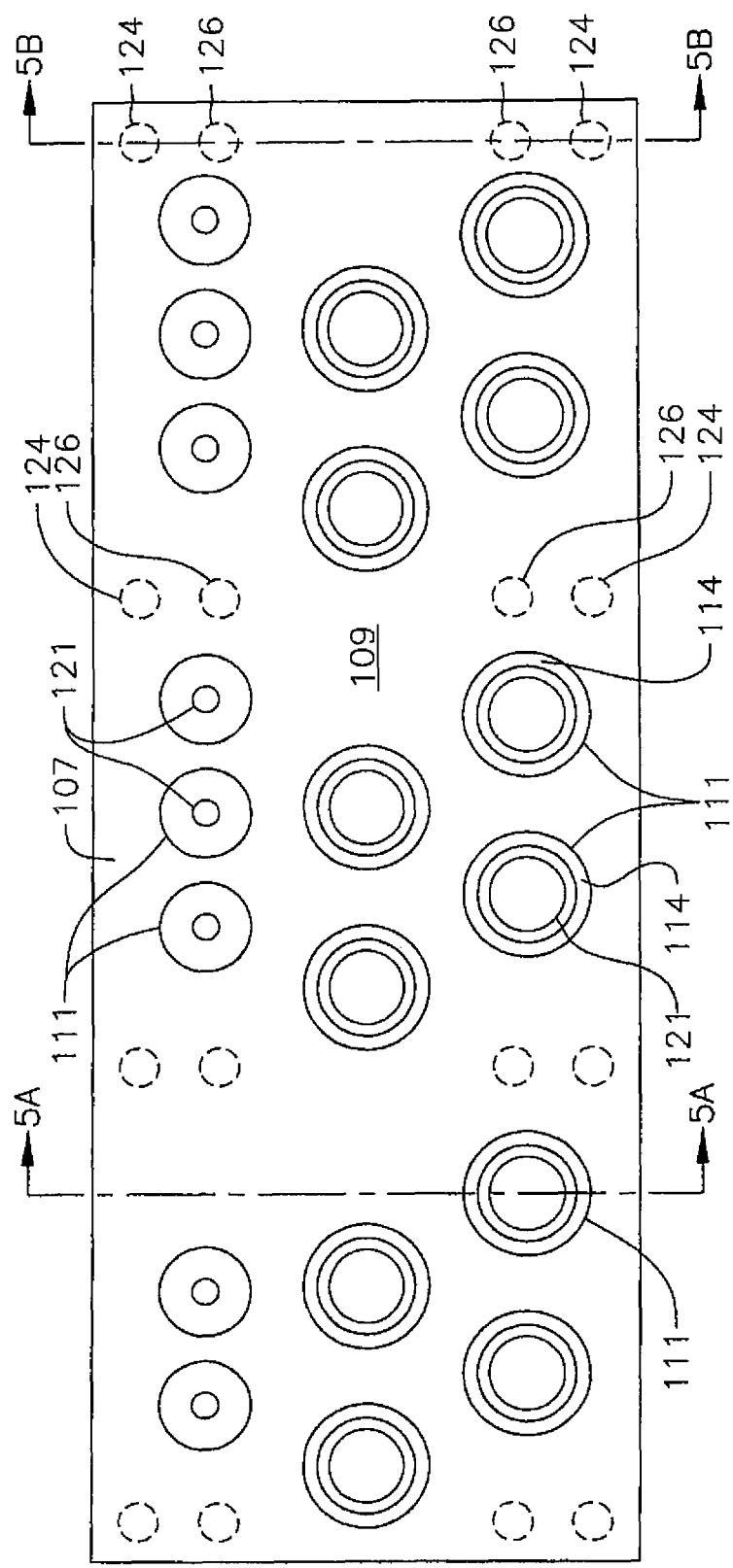
FIG. 4 is a rear view of the junction box and the sealing system of FIG. 2 according to one embodiment of the present invention.

With reference now to the embodiment illustrated in FIGS. 3A and 3B, the clamping member 107 is a generally rectangular plate having an interface surface 108 and an inner surface 109 opposite the interface surface 108. It will be appreciated that the clamping member 107 may have any other suitable shape, such a square or circular. The interface surface 108 of the clamping member 107 is configured to abut an inner interface surface 110 of the sealing member 106, as described in more detail below. The clamping member 107 also includes a plurality of apertures 111 extending between the interface surface 108 and the inner surface 109. The apertures 111 in the clamping member 107 are configured to receive the flexible longitudinal members 101 (e.g., conduits, tubes, wires, etc.) extending between the motor housing 102 and the junction box 103. In the illustrated embodiment, the apertures 111 in the clamping member 107 are substantially circular in cross-section, although it will be appreciated that the apertures 111 may have any other suitable shape. The apertures 111 may be provided in various sizes depending upon the outer diameter of the flexible longitudinal members 101. In the illustrated embodiment, the clamping member 107 includes both relatively smaller apertures 111a and relatively larger apertures 111b. Additionally, one or more of the apertures 111 in the clamping member 107 may include a smaller diameter hole 112 extending between the interface surface 108 and the inner surface 109 and a cylindrical recess or depression 113 in the interface surface 108. The cylindrical recess 113 has a larger diameter than the corresponding hole 112. Additionally, the cylindrical recess 113 is concentric with the smaller diameter hole 112 in the clamping member 107 such that the cylindrical recess 113 extends around the periphery of the relatively smaller hole 112. In the illustrated embodiment, the relatively larger apertures 111b include cylindrical recesses 113 in the interface surface 108, but the relatively smaller apertures 111a do not include cylindrical recesses 113, the significance of which is described below.

In one embodiment, the clamping member 107 may be formed of a non-magnetic material, such as 304 stainless steel. The use of a non-magnetic material is configured to prevent eddy currents from heating up the clamping member 107 when a conductor passes through the clamping member 107. Otherwise, the use of a magnetic metal may induce eddy currents in the clamping member 107 when a conductor extends through the clamping member 107.

With continued reference to FIGS. 3A and 3B, a plurality of sleeves 114 are configured to be received in one or more of the apertures 111 in the clamping member 107. In FIGS. 3A and 3B, one of the sleeves 114 is shown exploded out from one of the apertures 111 in the clamping member 107. The sleeves 114 may be formed of a non-conductive material, such as polytetrafluoroethylene (PTFE) or any other suitable material. In the illustrated embodiment, each of the sleeves 114 includes a generally cylindrical tube portion 115 and an annular flange portion 116 extending circumferentially around one end of the cylindrical portion 115. Each of the sleeves 114 also defines an opening 117 configured to receive one of the flexible longitudinal members 101. The annular flange portion 116 is larger than the generally cylindrical tube portion 115 such that an annular step or lip 118 is formed between the flange and tube portions 116, 115. In one embodiment, the sleeves 114 are generally T-shaped in longitudinal cross-section (see FIG. 5A). In the illustrated embodiments, the flange portion 116 of the sleeve 114 is configured to be received or seated in the cylindrical recess 113 in the clamping member 107 and the tube portion 115 of the sleeve 114 is configured to extend into the smaller hole portion 112 of the aperture 111. The lip 118 on the sleeve 114 is configured to retain the sleeve 114 in the aperture 111 and prevent the sleeve 114 from inadvertently disengaging the aperture 111. Although the sleeve 114 is illustrated as a single unitary member, in an alternate embodiment the sleeve 114 may be formed as two separable halves (i.e., the sleeve 114 may include a first portion and a second portion detachable from the first portion). The sleeves 114 may also be retained in the apertures 111 in the clamping member 107 by any suitable adhesive.

Each of the sleeves 114 is configured to surround a portion of one of the flexible longitudinal members 101 (e.g., a wire, tube, or conduit) and thereby prevent contact between the flexible longitudinal members 101 and the clamping member 107. For instance, in an embodiment in which the flexible member 101 is an insulated wire, the sleeve 114 may prevent the insulation from abrading against the clamping member 107. The sleeves 114 are also configured to prevent the flexible longitudinal members 101 from radially loading the sealing member 106, which could otherwise compromise the efficacy of the sealing system 100. That is, radially loading on the sealing member 106 could radially elongate the apertures in the sealing member 106 through which the flexible longitudinal members 101 pass, thereby creating a potential leak path. In one embodiment, the weight and diameter of the flexible longitudinal members 101 may be low enough and small enough, respectively, such that the flexible longitudinal members 101 do not have the capacity to radially elongate the apertures in the sealing member 106 (e.g., small, lightweight wires 101 may not present the risk of elongating the apertures in the sealing member 106). Accordingly, in one embodiment, the relatively smaller apertures 111*a* in the clamping member 107, which are configured to receive smaller diameter wires 101, may be provided without the sleeves 114 (i.e., only the relatively larger apertures 111*b* in the clamping member 107 may be provided with the sleeves 114).

With continued reference to FIGS. 3A and 3B, the sealing member 106 comprises a generally rectangular sheet or layer having an inner interface surface 119 and an outer interface surface 120 opposite the inner interface surface 119. In one embodiment, the sealing member 106 is made of an elastomeric polymer, such as silicone. The sealing member 106 includes a plurality of apertures 121 configured to receive the flexible longitudinal members 101 extending between the motor housing 102 and the junction box 103. In the illustrated embodiment, the sealing member 106 includes relatively smaller apertures 121*a* and relatively larger apertures 121*b*. The relatively smaller apertures 121*a* and the relatively larger apertures 121*b* in the sealing member 106 are configured to align with the relatively smaller apertures 111*a* and the relatively larger apertures 111*b*, respectively, in the clamping member 107. When the clamping member 107 is drawn into engagement with the sealing member 106, the apertures 121 in the sealing member 106 circumferentially contract around the flexible longitudinal members 101, thereby creating a water tight seal around the flexible longitudinal members 101. In one embodiment, the apertures 121 in the sealing member 106 are generally circular in cross-section, although it will be appreciated that the apertures 121 in the sealing member 106 may have any other suitable shape. In one embodiment, in an uncompressed stated, the apertures 121 in the sealing member 106 are slightly smaller than the outer diameter of the flexible longitudinal members 101. In alternate embodiments, however, the apertures 121 (in the uncompressed state) in the sealing member 106 may be substantially the same size as the outer diameter of the flexible longitudinal members 101 or may even be slightly larger than the outer diameter of the flexible longitudinal members 101, depending upon the compressibility of the sealing member 106. Additionally, the sealing member 106 includes a plurality of openings 122 configured to receive a plurality of fasteners 125 and a plurality of openings 123 configured to receive a plurality of pins 127, as described in more detail below.

With continued reference to FIGS. 3A and 3B, the sealing system 100 includes a plurality of bores 124 (e.g., threaded blind bores) in the interface surface 108 of the clamping member 107, which are configured to receive a plurality of fasteners 125 to draw the clamping member 107 into engagement with the sealing member 106. As the fasteners 125 are threaded into the threaded blind bores 124 in the clamping member 107, the clamping member 107 is drawn into engagement with the sealing member 106, thereby compressing the sealing member 106 and creating a seal around the flexible longitudinal members 101 passing through the apertures 121, 111 in the sealing member 106 and the clamping member 107, respectively. Providing blind bores 124, rather through-hole bores, eliminates a potential leak path into the junction box 103 (i.e., the threaded blind bores 124 do not extend all the way to the inner surface 109 of the clamping member 107). That is, providing through-hole bores, rather than blind bores, in the clamping member 107 could allow water to leak along the threads and into the junction box 103. However, the present invention is not limited to a clamping member 107 having blind bores 124. In an alternate embodiment, the clamping member 107 may include through-hole bores, and a sealing material may be applied to prevent water from leaking into the junction box 103.

Still referring to FIGS. 3A and 3B, the sealing system 100 also includes a plurality of blind bores 126 (e.g., smooth bores) in the interface surface 108 of the clamping member 107. In one embodiment, the smooth blind bores 126 are located adjacent the threaded blind bores 124, although it will be appreciated that the smooth blind bores 126 may be located at any other suitable location on the clamping member 107. The smooth blind bores 126 are configured to receive a plurality of pins or dowel rods 127 with a press-fit (i.e., interference fit) connection. The pins 127 are configured to prevent over-compression of the sealing member 106 due to over-torqueing of the fasteners 125. That is, the pins 127 are configured to limit the amount the sealing member 106 can be compressed by the clamping member 107, as will be described below with reference to FIG. 5B. In the illustrated embodiment, the smooth blind bores 126 are generally circular in transverse cross-section, although the smooth blind bores 126 may have any other suitable shape, such as square or rectangular in transverse cross-section, and still fall within the scope and spirit of the present invention. In another embodiment, the clamping member 107 may be provided without the smooth blind bores 126 and the pins 127 may be coupled (e.g., welded) to the interface surface 108 of the clamping member 107.

As illustrated in the embodiment shown in FIGS. 3A and 3B, the sealing system 100 of the present invention also includes a junction plate 128. The sealing member 106 is disposed between the clamping member 107 and the junction plate 128 (i.e., the sealing member 106 is configured to be compressed between the clamping member 107 and the junction plate 108). In one embodiment, the junction plate 108 is a generally rectangular plate having a generally flat outer surface 129 and a generally flat inner interface surface 130 configured to abut the outer interface surface 120 of the sealing member 106. The junction plate 108 also includes a plurality of apertures 131 configured to receive the flexible longitudinal members 101. In the illustrated embodiment, the junction plate 128 includes relatively smaller apertures 131*a* and relatively larger apertures 131*b*. The plurality of apertures 131 are configured to align with the plurality of apertures 121, 111 in the sealing member 106 and the clamping member 107, respectively. Accordingly, the flexible longitudinal members 101 (e.g., tubes, pipes, conduits, cables, etc.) are configured to pass through the aligned apertures 131, 121, 111 in the junction plate 128, the sealing member 106, and the clamping member 107, respectively. The plurality of larger apertures 131*b* in the junction plate 128 are also configured to receive a plurality of sleeves 114, substantially as described above with reference to the clamping member 107. In FIGS.

3A and 3B, one of the sleeves 114 is shown exploded out from one of the larger apertures 131b in the junction plate 128.

Moreover, as described above with reference to the clamping member 107, one or more of the larger apertures 131b in the junction plate 128 may include a cylindrical recess or depression 133 in the inner interface surface 130 of the junction plate 128. The depressions 133 are configured to receive the annular flange portion 116 of the sleeve 114, thereby securing the one or more sleeves 114 to the one or more apertures 131 in the junction plate 128. Together, the sleeves 114 in the junction plate 128 and the clamping member 107 are configured to minimize radial loading on the sealing member 106 disposed between the junction plate 128 and the clamping member 107. For instance, a curved segment of the flexible longitudinal members 101 passing through the apertures 131, 121, 111 in the junction plate 128, the sealing member 106, and the clamping member 107, respectively, may impart a radial load on the sealing member 106. The radial load on the sealing member 106 may cause the apertures 121 in the sealing member 106 to elongate radially (e.g., the circular apertures 121 may elongate into ellipsoidal apertures under radial loading), thereby creating a potential leak path between the outer surface of the flexible longitudinal members 101 and the apertures 121 in the sealing member 106. Accordingly, the sleeves 114 are configured to maintain a straight segment of the flexible longitudinal members 101 passing through the junction plate 128, the sealing member 106, and the clamping member 107, as illustrated in FIG. 5A. Maintaining a straight segment of the flexible longitudinal members 101 minimizes the radial loading on the sealing member 106, and thereby prevents a potential leak path into the junction box 103.

With continued reference to FIGS. 3A and 3B, the junction plate 128 also includes a plurality of openings 134 configured to receive the plurality of fasteners 125 coupling the clamping member 107 to the junction plate 128. In the illustrated embodiments, the sealing system 100 includes eight fasteners 125 configured to adjustably couple the clamping member 107 to the junction plate 128. The head portion 135 of each fastener 125 is configured to abut the outer surface 129 of the junction plate 128 (i.e., the surface opposite the interface surface 130 of the junction plate 128) and the shaft portion 136 of each fastener 125 is configured to extend completely through the openings 134, 122 in the junction plate 128 and the sealing member 106, respectively, and into the threaded blind bores 124 in the clamping member 107. As the fasteners 125 are tightened, the clamping member 107 is drawn toward the junction plate 128, thereby compressing the sealing member 106 between the junction plate 128 and the clamping member 107. Said another way, the distance between the clamping member 107 and the junction plate 128 is adjustable by tightening or loosening the fasteners 125 coupling the clamping member 107 to the junction plate 128. Accordingly, tightening the fasteners 125 increases the compression of the sealing member 106 and loosening the fasteners 125 decreases the compression of the sealing member 106. As described above, the compression of the sealing member 106 causes the apertures 121 in the sealing member 106 to circumferentially contract around the flexible longitudinal members 101, thereby creating a water-tight seal around the flexible longitudinal members 101.

Still referring to FIGS. 3A and 3B, the junction plate 128 also includes a plurality of smooth blind bores 137 formed in the inner interface surface 130 of the junction plate 128. The smooth blind bores 137 in the junction plate 128 are configured to slidably receive the pins or dowel rods 127 coupled to the clamping member 107. In one embodiment, the smooth blind bores 137 in the junction plate 128 are slightly larger than the smooth bores 126 in the clamping member 107 such that the pins 127 are slidably received into the smooth bores 137 in the junction plate 128 with a clearance fit (i.e., in one embodiment, the pins 127 are press fit into the bores 126 in the clamping member 107 and clearance fit into the bores 137 in the junction plate 128). The pins 127 are configured to limit the amount the sealing member 106 may be compressed (i.e., the pins 127 are configured to prevent over-compression of the sealing member 106), as described in more detail below.

With reference now to the embodiment illustrated in FIG. 5B, the pins 127 are configured to move between a position spaced apart from bottom surfaces 138 of the smooth bores 137 in the junction plate 128 and a position abutting the bottom surfaces 138 of the smooth bores 137 in the junction plate 128. In the illustrated embodiment, the pins 127 are shown abutting the bottom surfaces 138 of the smooth bores 137 in the junction plate 128. The abutment between the pins 127 and the bottom surfaces 138 of the smooth bores 137 in the junction plate 128 prevents further compression of the sealing member 106 between the clamping member 107 and the junction plate 128. When the sealing member 106 is not in a fully compressed position, the pins 127 are spaced apart from the bottom surfaces 138 of the smooth bores 137 in the junction plate 128. When the sealing member 106 is in the fully compressed position, the pins 127 abut the bottom surfaces 138 of the smooth bores 137 in the junction plate 128. In the illustrated embodiment of FIG. 3B, the sealing system 100 includes eight pins 127, which corresponds to the number of fasteners 125 adjustably coupling the clamping member 107 to the junction plate 128. It will be appreciated, however, that the number of pins 127 may differ from the number of fasteners 125.

In one embodiment, the junction plate 128 may be formed as an integral part of the junction box 103 (e.g., the junction plate 128 may be a portion of the wall 104 of the junction box 103, as shown in FIGS. 2 and 5B) or may be formed as a separate member coupled to the junction box 103. Moreover, although the junction plate 128 has been described above with reference to a junction box 103, the junction plate 128 may be used in any other suitable application. Additionally, in an alternate embodiment, the sealing system 100 may not include a junction plate 128. In one embodiment, the junction plate 128 may be formed of a non-magnetic material, such as 304 stainless steel.

As illustrated in FIGS. 5A and 5B, the clamping member 107 is sized to permit the clamping member 107 to be disconnected from the junction plate 128 and placed into an interior compartment 139 (see also FIG. 1) in the top drive motor housing 102, which facilitates maintenance and other work on the top drive. That is, the flexible longitudinal members 101 may be disconnected from the buss bars or other electrical disconnects inside the junction box 103 and the clamping member 107 may be disconnected from the junction plate 128. Subsequently, the flexible longitudinal members 101 (e.g., wires, conduits, etc.) and the clamping member 107 may be placed into the top drive motor housing 102 during maintenance or other work on the top drive.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "distal, "proximal" and similar terms have been used herein to describe a spatial relationship of one element to another, it is understood that these terms are intended to encompass different orientations of the various elements and components of the device in addition to the orientation depicted in the figures. Moreover, the figures contained in this application are not necessarily drawn to scale. Although the sealing system of the present invention is shown and described in use with a top drive, the sealing system is not limited to such applications, and the sealing system of the present invention may be used in any industry to provide a seal around flexible longitudinal members (e.g., tubes, wires, conduits, cables, etc.) penetrating through a wall segment.

What is claimed is:

1. A system configured to form a seal around at least one flexible longitudinal member, the system comprising:
    a sealing member having a first set of apertures, a second set of apertures, an inner interface surface, and an outer interface surface, at least one aperture of the first set of apertures configured to receive the at least one flexible longitudinal member;
    a clamping member having a first set of apertures and an interface surface, the first set of apertures in the clamping member configured to align with the first set of apertures in the sealing member, the interface surface of the clamping member configured to abut the inner interface surface of the sealing member;
    a junction plate having a first set of apertures and a second set of apertures;
    at least one sleeve received in at least one aperture of the first set of apertures of the junction plate and configured to receive the at least one flexible longitudinal member;
    at least one sleeve received in at least one aperture of the first set of apertures in the clamping member and configured to receive the at least one flexible longitudinal member;
    at least one threaded blind bore in the interface surface of the clamping member; and
    at least one fastener configured to extend through at least one aperture of the second set of apertures of the junction plate, at least one aperture of the second set of apertures in the sealing member, and into the at least one threaded blind bore in the clamping member, the at least one fastener configured to draw the clamping member into engagement with the sealing member,
    wherein the sealing member is configured to move between an uncompressed position and a compressed position, and
    wherein when the sealing member is in the compressed position, an inner diameter of the at least one aperture of the first set of aperatures in the sealing member is smaller than an inner diameter of each of the sleeves.

2. The system of claim 1, wherein the first set of apertures in the clamping member includes at least one smaller aperture and at least one larger aperture, each of the at least one larger aperture housing the at least one sleeve received in the clamping member.

3. The system of claim 1, wherein the clamping member further comprises at least one pin protruding from the interface surface of the clamping member.

4. The system of claim 1, wherein the at least one aperture of the first set of apertures in the sealing member is configured to circumferentially contract around the at least one flexible longitudinal member when the clamping member is drawn into engagement with the sealing member by the fastener.

5. The system of claim 2, wherein the at least one sleeve received in the clamping member and the at least one sleeve received in the junction plate each comprise a non-conductive material.

6. The system of claim 1, wherein the clamping member comprises a non-magnetic metal.

7. The system of claim 2, wherein the sleeve housed in the at least one larger aperture of the clamping member comprises:
    a cylindrical tube portion;
    an annular flange portion circumferentially extending around a first end of the cylindrical tube; and
    an annular lip defined between the cylindrical tube portion and the annular flange portion.

8. The system of claim 7, wherein the at least one larger aperture in the clamping member includes a recess in the interface surface.

9. The system of claim 8, wherein the annular flange on the at least one sleeve received in the clamping member is configured to be received in the recess in the clamping member to retain the at least one sleeve received in the clamping member in the aperture.

10. The system of claim 1, wherein the flexible longitudinal member is selected from the group consisting of an insulated wire, a conductor, a conduit, a pipe, and a tube.

11. The system of claim 3, the junction plate further comprising an inner interface surface,
    wherein the first set of apertures in the junction plate is configured to align with the first set of apertures in the sealing member and the first set of apertures in the clamping member, and
    wherein the inner interface surface of the junction plate is configured to abut the outer interface surface of the sealing member.

12. The system of claim 11, wherein the junction plate further includes at least one bore in the interface surface, the at least one bore in the junction plate having a depth and a bottom surface, and wherein the at least one bore in the junction plate is configured to slidably receive a portion of the at least one pin protruding from the clamping member.

13. The system of claim 12, wherein the at least one pin is configured to slide between a disengaged position in which the at least one pin is spaced apart from the bottom surface of the at least one bore in the junction plate by a first distance, and an engaged position in which the at least one pin is spaced apart from the bottom surface of the at least one bore in the junction plate by a second distance.

14. The system of claim 13, wherein the second distance is substantially zero.

15. The system of claim 11, wherein the first set of apertures in the junction plate includes at least one smaller aperture and at least one larger aperture, each of the at least one larger aperture housing the at least one sleeve.

16. The system of claim 1, wherein the clamping member is generally rectangular.

17. The system of claim 1, wherein the sealing member is generally rectangular.

18. The system of claim 3, wherein one of the at least one threaded blind bore in the interface surface of the clamping member is adjacent one of the at least one pin protruding from the interface surface of the clamping member.

19. The system of claim 12, wherein the at least one pin protrudes from the interface surface of the clamping member by a first distance, and wherein the first distance is at least as great as the depth of the at least one bore in the junction plate.

20. The system of claim 1, wherein the at least one aperture of the first set of apertures in the sealing member is generally circular in transverse cross-section.

21. A method of forming a seal around at least one flexible longitudinal member, the method comprising:
- placing a sealing member on a junction plate having a first set of apertures and a second set of apertures, at least one aperture of the first set of apertures of the junction plate receiving at least one sleeve, and the sealing member having a first set of apertures, a second set of apertures, an inner interface surface, and an outer interface surface;
- placing a clamping member at the inner interface surface of the sealing member, the clamping member having a first set of apertures, an interface surface, and at least one threaded blind bore in the interface surface of the clamping member;
- aligning the first set of apertures in the clamping member with the first set of apertures in the sealing member;
- inserting the at least one flexible longitudinal member through the at least one sleeve in the at least one aperture of the first set of apertures in the junction plate;
- inserting the at least one flexible longitudinal member through at least one aperture of the first set of apertures in the sealing member;
- inserting the at least one flexible longitudinal member through at least one sleeve received in at least one aperture of the first set of apertures in the clamping member; and
- fastening at least one fastener extending through at least one aperture of the second set of apertures of the junction plate, at least one aperture of the second set of apertures in the sealing member, and into the at least one threaded blind bore in the clamping member to draw the clamping member into engagement with the sealing member, and to move the sealing member from an uncompressed position to a compressed position,
- wherein when the sealing member is in the compressed position, an inner diameter of the at least one aperture of the first set of apertures in the sealing member is smaller than an inner diameter of each of the sleeves.

* * * * *